(12) United States Patent
Schneider et al.

(10) Patent No.: US 10,372,747 B1
(45) Date of Patent: Aug. 6, 2019

(54) DEFINING CONTENT PRESENTATION INTERFACES BASED ON IDENTIFIED SIMILARITIES BETWEEN RECEIVED AND STORED MEDIA CONTENT ITEMS

(71) Applicant: Google Inc., Mountain View, CA (US)

(72) Inventors: Michael Patrick Schneider, Venice, CA (US); Justin Lewis, Marina del Rey, CA (US)

(73) Assignee: GOOGLE LLC, Mountain View, CA (US)

( * ) Notice: Subject to any disclaimer, the term of this patent is extended or adjusted under 35 U.S.C. 154(b) by 363 days.

(21) Appl. No.: 14/630,597

(22) Filed: Feb. 24, 2015

Related U.S. Application Data

(60) Provisional application No. 61/944,402, filed on Feb. 25, 2014.

(51) Int. Cl.
*G06F 16/438* (2019.01)
*G06F 16/43* (2019.01)

(52) U.S. Cl.
CPC ............ *G06F 16/438* (2019.01); *G06F 16/43* (2019.01)

(58) Field of Classification Search
CPC .. G06F 3/0481; G06F 3/048; G06F 17/30017; G06F 17/30058; G06F 17/3002; G06F 17/3005; G06F 16/43; G06F 16/438
USPC ............ 707/E17.009, 999.107, 999.102, 722
See application file for complete search history.

(56) References Cited

U.S. PATENT DOCUMENTS

| | | | |
|---|---|---|---|
| 8,479,226 B1* | 7/2013 | Cave ...................... | H04H 60/32 348/42 |
| 2008/0209339 A1* | 8/2008 | Macadaan ............. | G06F 3/0482 715/745 |
| 2008/0212941 A1* | 9/2008 | Lillethun ............... | H04N 5/782 386/249 |
| 2009/0210477 A1* | 8/2009 | White ................ | H04N 7/17318 709/202 |
| 2011/0066487 A1* | 3/2011 | Charania ................ | G06Q 10/00 705/14.43 |
| 2012/0117471 A1* | 5/2012 | Amidon .................... | H04N 5/76 715/716 |
| 2012/0188382 A1* | 7/2012 | Morrison .......... | G06F 17/30265 348/207.1 |
| 2015/0213001 A1* | 7/2015 | Levy ................... | G06F 17/3005 715/202 |

* cited by examiner

*Primary Examiner* — Robert W Beausoliel, Jr.
*Assistant Examiner* — Pedro J Santos
(74) *Attorney, Agent, or Firm* — Lowenstein Sandler LLP

(57) ABSTRACT

Systems and methods are disclosed for defining content presentation interfaces based on identified similarities between received and stored media content items. In one implementation, a processing device receives a first media content item from a content creator. The processing device processes the first media content item in relation to one or more media content items associated with a content owner to identify one or more similarities between the first media content item and the one or more media content items. The processing device defines, based on an identification of one or more similarities between the first media content item and the one or more media content items and in relation to the content owner, one or more aspects of a content presentation interface within which the first media content item is presented.

19 Claims, 6 Drawing Sheets

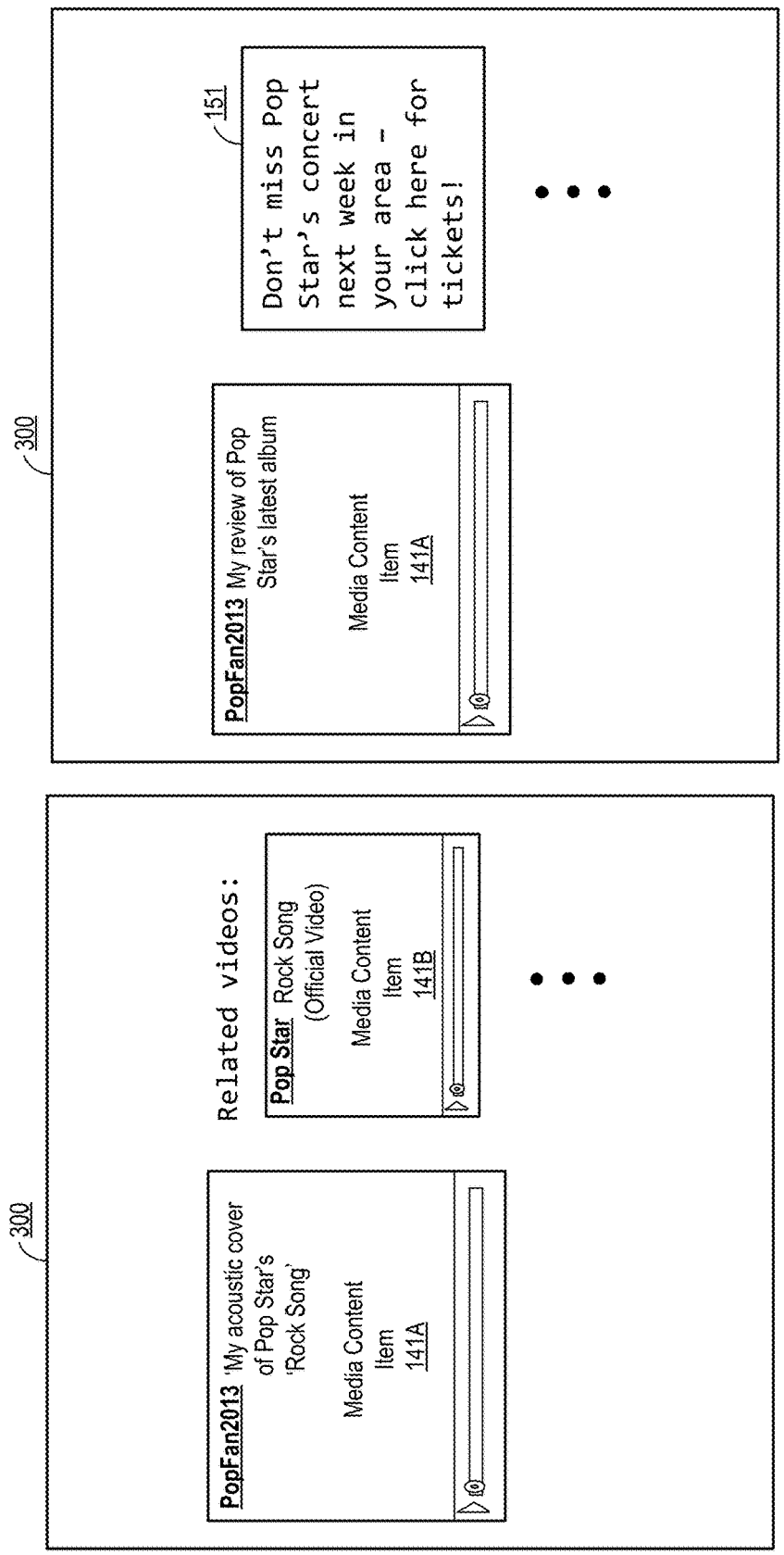

FIG. 3C

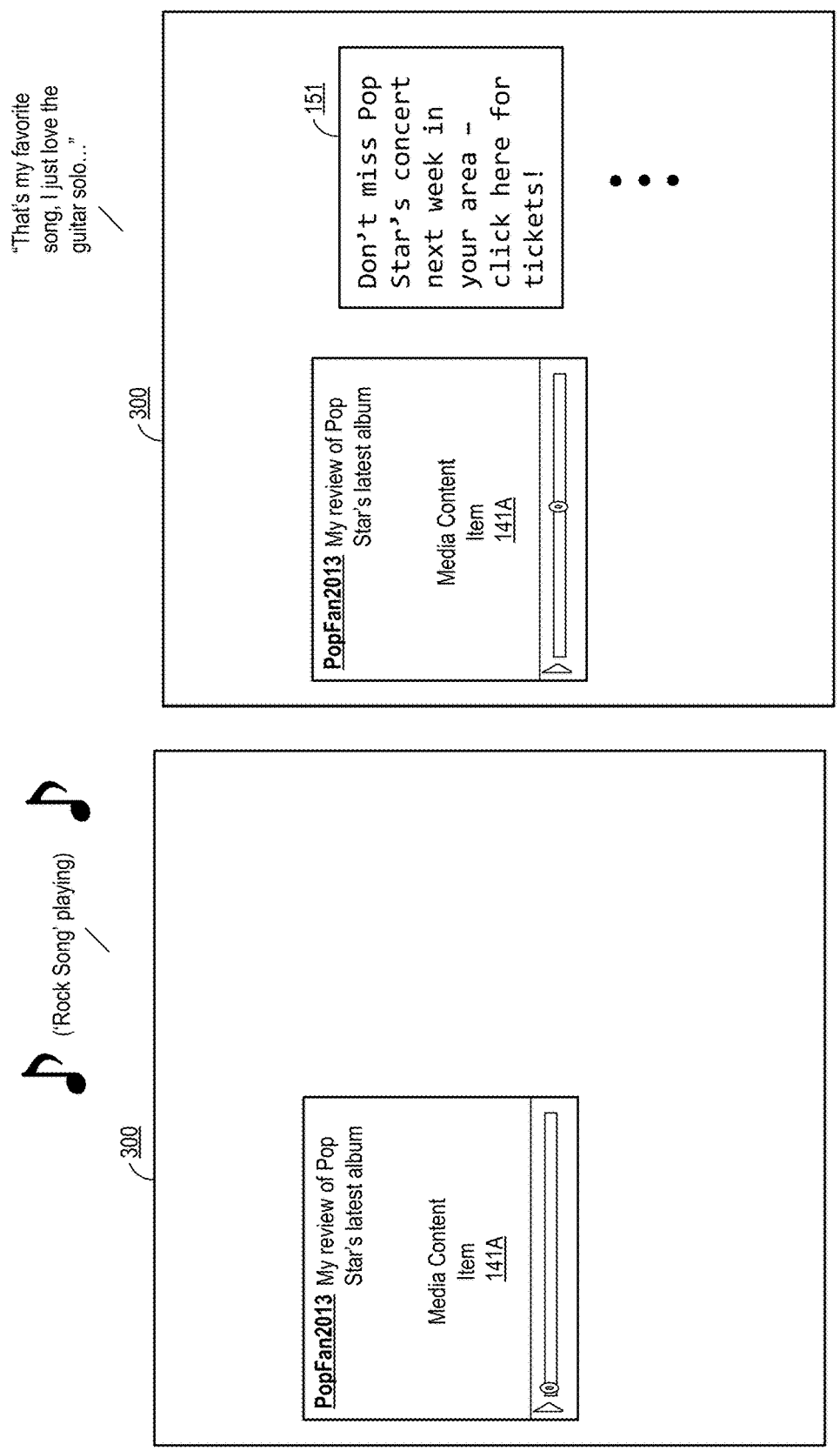

DEFINING CONTENT PRESENTATION INTERFACES BASED ON IDENTIFIED SIMILARITIES BETWEEN RECEIVED AND STORED MEDIA CONTENT ITEMS

CROSS-REFERENCE TO RELATED APPLICATION

This application is related to and claims the benefit of U.S. Patent Application No. 61/944,402, filed Feb. 25, 2014, the entirety of which is incorporated herein by reference.

TECHNICAL FIELD

Aspects and implementations of the present disclosure relate to data processing, and more specifically, to defining content presentation interfaces based on identified similarities between received and stored media content items.

BACKGROUND

Audio and video content can be stored on data servers and provided to users for listening/viewing over the Internet. Applications for supporting the listening/viewing of such audio and video content may be browser-based, or may run independently of a browser.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device receives a first media content item from a content creator. The processing device processes the first media content item in relation to one or more media content items associated with a content owner to identify one or more similarities between the first media content item and the one or more media content items. The processing device defines, based on an identification of one or more similarities between the first media content item and the one or more media content items and in relation to the content owner, one or more aspects of a content presentation interface within which the first media content item is presented.

In another aspect, a processing device presents, within a content presentation interface, a media content item provided by a content creator. The processing device defines, in relation to a content owner, one or more aspects of the content presentation interface based on an identification of one or more similarities between the media content item and one or more media content items associated with the content owner.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 3A depicts an exemplary content presentation interface, in accordance with one implementation of the present disclosure.

FIG. 3B depicts an exemplary content presentation interface, in accordance with one implementation of the present disclosure.

FIG. 3C depicts an exemplary content presentation interface, in accordance with one implementation of the present disclosure.

FIG. 4A depicts an exemplary content presentation interface, in accordance with one implementation of the present disclosure.

FIG. 4B depicts an exemplary content presentation interface, in accordance with one implementation of the present disclosure.

DETAILED DESCRIPTION

Figure 1:
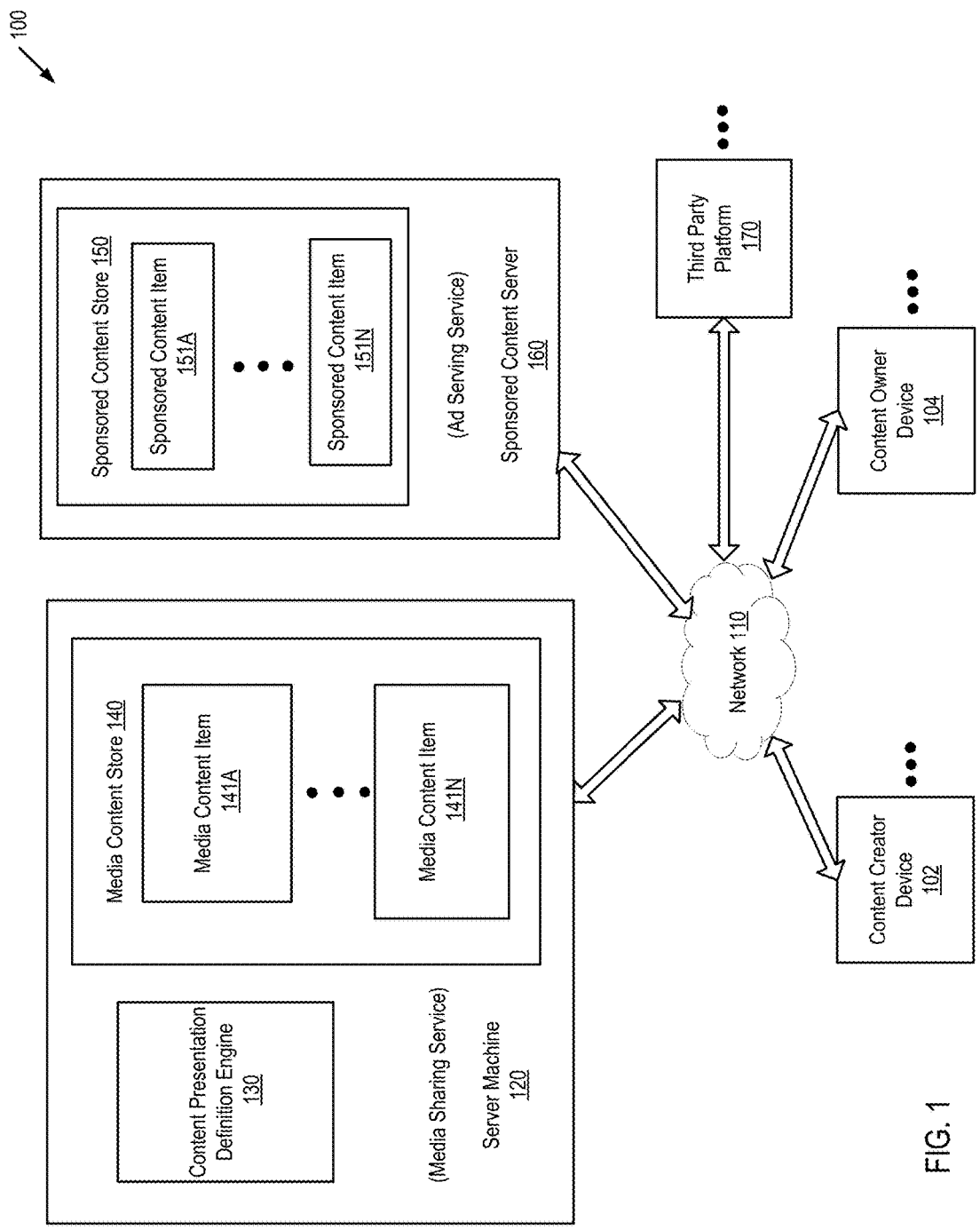
FIG. 1 depicts an illustrative system architecture, in accordance with one implementation of the present disclosure.

Aspects and implementations of the present disclosure are directed to defining content presentation interfaces based on identified similarities between received and stored media content items. The systems and methods disclosed can be applied to media content such as audio and/or video content, images, and/or any other content that can be collected and/or disseminated such as via a media sharing service or website. More particularly, various technologies enable media content owners (e.g., individuals and/or entities that possess and/or control the legal rights to various audio, video, images, etc., such as individual artists, music publishing companies, movie studios, etc.) to identify/detect when other users have provided/uploaded content that includes or otherwise incorporates one or more of the media content items (and/or aspects thereof) that are owned/controlled by the content owner. Upon identifying that a media content item has been provided (e.g., to a media sharing service) that includes/incorporates a media content item owned/controlled by a content owner, such a content owner may elect to block/remove the identified media content item, to track its performance (e.g., the number of views it receives), and/or to monetize it through the placement of sponsored content (e.g., advertisements) in conjunction with the presentation of the media content item. However, in various scenarios such options are inadequate for many content owners. For example, in many scenarios content owners may wish to encourage other users to create such media content items that incorporate aspects of media content items that are owned/controlled by the content owner (e.g., fan videos, 'cover' performances, 'remixes,' etc.), as the creation and proliferation/viewing of such media content items can also increase exposure/publicity for the content owner. At the same time, many content owners are conscious of their brand/image and may not want other users (e.g., content creators) to create and distribute content in a manner that is inconsistent with the brand, image, etc., associated with the content owner.

Accordingly, described herein in various embodiments are technologies that enable defining content presentation interfaces based on identified similarities between received and stored media content items. For example, as described herein, upon identifying one or more similarities/matches between a media content item provided by a content creator and a media content item owned by a content owner, one or more aspects of the content presentation interface within which the media content item provided by the content creator can be defined, adjusted, configured, etc., such as in relation to the content owner. For example, a content owner may dictate which 'related videos' are to be presented in conjunction with a media content item that contains content owned by the content owner. By way of further example, a content owner may dictate whether or not and/or how sponsored content items (e.g., advertisements) are to be presented in conjunction with a media content item that contains content owned by the content owner. In doing so, a content owner can better define and ensure that other content items which incorporate content owned by the content owner are being presented in a manner that is consistent with the wishes of the content owner, such as is described herein.

FIG. 1 depicts an illustrative system architecture 100, in accordance with one implementation of the present disclosure. The system architecture 100 includes content creator device 102, content owner device 104, server machine 120, sponsored content server 160, and third party platform 170. These various elements or components can be connected to one another via network 110, which can be a public network (e.g., the Internet), a private network (e.g., a local area network (LAN) or wide area network (WAN)), or a combination thereof.

Content creator device 102 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. In certain implementations, content creator device 102 can enable a media content creator, such as a user or entity that creates media content (e.g., audio, video, images, etc.) to provide (e.g., upload) such media content items to a server machine (e.g., server machine 120), such as a server configured as a media sharing service that can allow other users to view or otherwise acquire/obtain access to the provided media content items via the service. Additionally, content creator device 102 may run an operating system (OS) that manages hardware and software of the content creator device 102. Various applications, such as mobile applications ('apps'), web browsers, etc. (not shown) may run on the content creator device (e.g., on the OS of the content creator device). Such applications can, for example, enable a user to capture media content (e.g., an audio clip, a video clip, etc.), provide media content (e.g., upload media content to a central server and/or transmit it to another user), receive media content (e.g., via network 110), and/or view, display, or otherwise present media content (e.g., playing a video, listening to a song, etc.), such as via the content creator device 102.

Content owner device 104 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. In certain implementations, content owner device 104 can enable a media content owner, such as one or more individuals and/or entities that possess and/or control the legal rights to one or more media content items (e.g., audio, video, images, etc.), such as media content item(s) stored on a server machine (e.g., server machine 120), such as a server configured as a media sharing service that can allow other users to view or otherwise acquire/obtain access to the provided media content items via the service. Additionally, content owner device 104 may run an operating system (OS) that manages hardware and software of the content owner device 104. Various applications, such as mobile applications ('apps'), web browsers, etc. (not shown) may run on the content owner device (e.g., on the OS of the content owner device). Such applications can, for example, enable a user to capture media content (e.g., an audio clip, a video clip, etc.), provide media content (e.g., upload media content to a central server and/or transmit it to another user), receive media content (e.g., via network 110), and/or view, display, or otherwise present media content (e.g., playing a video, listening to a song, etc.), such as via the content owner device 102.

Server machine 120 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. Server machine 120 can include components such as content presentation definition engine 130, and media content store 140. The components can be combined together or separated in further components, according to a particular implementation. It should be noted that in some implementations, various components of server machine 120 may run on separate machines. Moreover, some operations of certain of the components are described in more detail below with respect to FIG. 2.

Media content store 140 can be hosted by one or more storage devices, such as main memory, magnetic or optical storage based disks, tapes or hard drives, NAS, SAN, and so forth. In some implementations, media content store 140 can be a network-attached file server, while in other implementations media content store 140 can be some other type of persistent storage such as an object-oriented database, a relational database, and so forth, that may be hosted by the server machine 120 or one or more different machines coupled to the server machine 120 via the network 110, while in yet other implementations media content store 140 may be a database that is hosted by another entity and made accessible to server machine 120.

Media content store 140 can include media content items 141A-141N. In certain implementations, media content items 141A-141N can correspond to media content itself (e.g., audio clips, video clips, images, etc.) and can be provided, for example, by a content owner. Moreover, in certain implementations, server machine 120 can be configured to allow full and/or substantially unlimited access to such media content items. Accordingly, users wishing to access or view such media content items via the media sharing service can be enabled, under most circumstances, to do so. Alternatively, in certain implementations server machine 120 can be configured to utilize media content items 141 for reference purposes (e.g., to compare to other media content items to identify similarities/matches between the various media content items), though such media content items are not accessible to users/viewers of the media sharing service.

Media content store 140 can be hosted by one or more storage devices, such as main memory, magnetic or optical storage based disks, tapes or hard drives, NAS, SAN, and so forth. In some implementations, media content store 140 can be a network-attached file server, while in other implementations media content store 140 can be some other type of persistent storage such as an object-oriented database, a relational database, and so forth, that may be hosted by the server machine 120 or one or more different machines coupled to the server machine 120 via the network 110, while in yet other implementations media content store 140 may be a database that is hosted by another entity and made accessible to server machine 120.

Sponsored content server 160 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. Sponsored content server 160 can include components such as sponsored content store 150. The components can be combined together or separated in further components, according to a particular implementation. It should be noted that in some implementations, various components of sponsored content server 160 may run on separate machines.

In certain implementations, sponsored content server 160 can be an advertisement serving system/service. Such an ad service system/service can receive requests for sponsored content from various content publishers, such as a video sharing sites and/or social networks. In response to requests from such content publishers, the ad serving system can provide various sponsored content items 151 (e.g., ads) for presentation within websites, applications, interfaces, etc., provided by such content publishers (e.g., to one or more users, such as via devices 102). In certain implementations, various content sponsors (e.g., advertisers) can provide compensation and/or other incentives to the ad serving service (e.g., on a per impression, per click, per conversion, etc. basis) in return for the ad serving service serving such ads to the various content publishers. In doing so, such content publishers can monetize their respective services (e.g., media sharing, social networking, etc.). Moreover, in certain implementations such content publishers can elect to share a portion of the revenue generated by the presentation of such sponsored content with various content creators that provide content (e.g., media content items) via the services provided by such content publishers (e.g., media sharing services, social networks, etc.). In doing so, a content publisher can further incentivize content creators to create and disseminate content (e.g., media content items) via a particular service (e.g., the media sharing service, social network, etc.).

Sponsored content store 150 can include sponsored content items 151A-151N. In certain implementations, sponsored content items 151A-151N can correspond to sponsored content (e.g., audio, video, images, display ads, banner ads, video ads, audio ads, interactive ads, etc.) provided by one or more third parties, such as advertisers. As noted, such advertisers provide compensation and/or other incentives to content publishers (e.g., media sharing sites, social networking sites, etc.) in return for such publishers providing sponsored content items 151 to users of a site or service of the publisher.

It should be understood that though FIG. 1 depicts server machine 120, sponsored content server 160, social networks 110, and devices 102 as being discrete components, in various implementations any number of such components (and/or elements/functions thereof) can be combined, such as within a single component/system. For example, in certain implementations server machine 120 can incorporate features of the sponsored content server, while in other implementations one or more of social networks 110 can incorporate features of the sponsored content server.

Third party platform 160 can be one or more servers, computers, devices, etc., that provide a framework for social networking services, such as those that enable users to communicate and/or share information with one another. In certain implementations, each social network can provide a website and/or an application that enables users to utilize the functionality provided by the social network. Moreover, in certain implementations various social networks can enable users to share or otherwise disseminate media content items to other users, such as by providing one or more links to such media content items within posts, pages, and/or any other such interfaces provided by the social network, and/or by embedding such media content items within such posts, pages, and/or interfaces.

Additionally, as described, in certain implementations such social networks can provide various sponsored content items (e.g., advertisements) within various interfaces, such as in order to generate revenue for the social networking service and/or to provide content that is relevant/of interest to users of the social networking service.

As described herein, upon identifying one or more similarities/matches between a media content item provided by a content creator and a media content item owned by a content owner, one or more aspects of the content presentation interface within which the media content item is provided by the content creator can be defined, adjusted, configured, etc., such as in relation to the content owner. In certain implementations, such operations can be performed by and/or in conjunction with content presentation definition engine 130.

Figure 2:
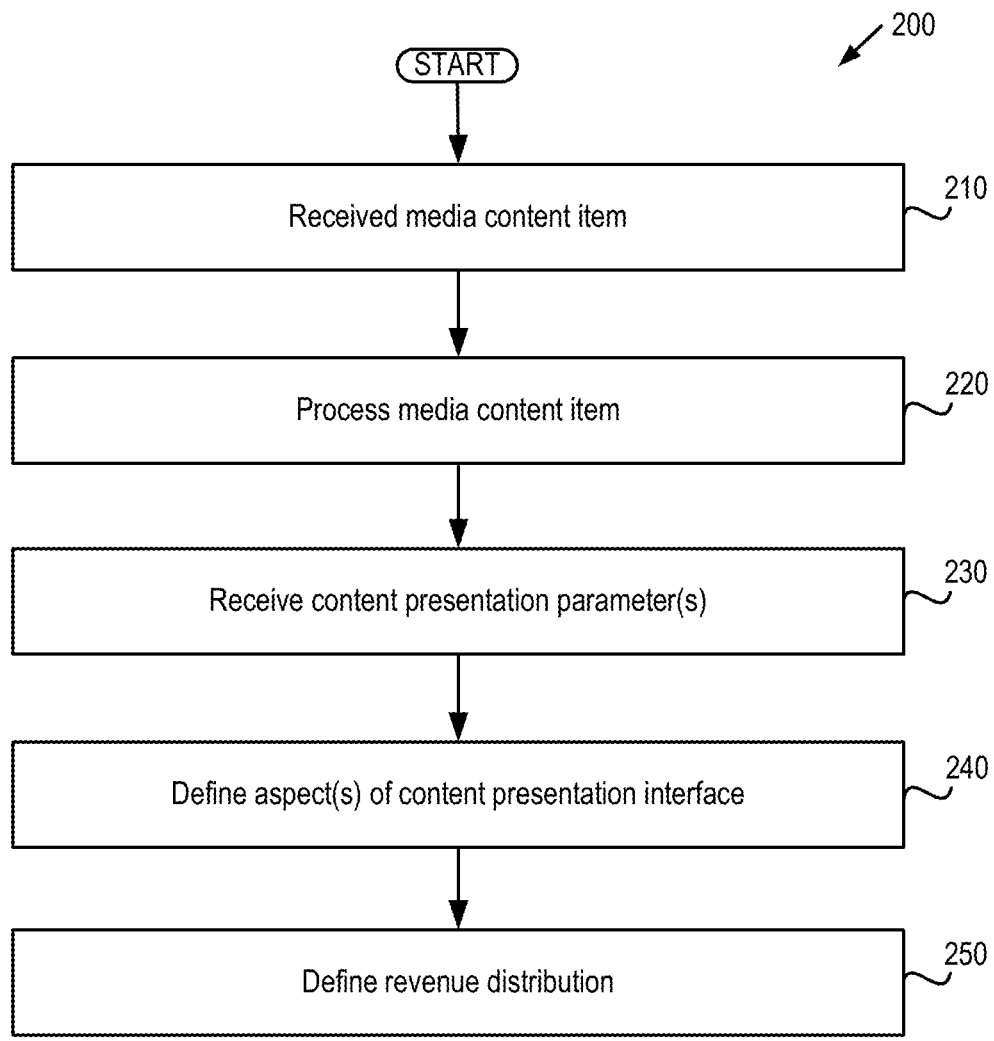
FIG. 2 depicts a flow diagram of aspects of a method for defining content presentation interfaces based on identified similarities between received and stored media content items.

FIG. 2 depicts a flow diagram of aspects of a method 200 for defining content presentation interfaces based on identified similarities between received and stored media content items. The method is performed by processing logic that may comprise hardware (circuitry, dedicated logic, etc.), software (such as is run on a general purpose computer system or a dedicated machine), or a combination of both. In one implementation, the method is performed by server machine 120 of FIG. 1, while in some other implementations, one or more blocks of FIG. 2 may be performed by another machine. For example, in various alternative implementations, the method can be performed at a social network 170 (i.e., the method or various aspects thereof can be performed locally at the social network 170 rather than in communication with a server such as server machine 120).

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 210, a media content item can be received. In certain implementations, such a media content item can be received from a content creator (e.g., as provided by content creator device 102 to a media sharing service 120 via network 110, as shown in FIG. 1). It should be understood that such a media content item may include and/or incorporate one or more media content items (and/or aspects thereof) that are owned/controlled by the content owner (as can be identified/determined, for example, as described herein). By way of illustration, such a media content item can be a video of a 'cover' performance of a song the rights to which are held by the content owner, a music video created by the content creator for the content creator for a song the rights to which are held by the content owner, a video review of a movie the rights to which are held by the content owner, etc. In one aspect, block 210 is performed by content presentation definition engine 130.

At block 220, a media content item (e.g., the media content item received at block 210) can be processed. In certain implementations, such a media content item can be processed in relation to one or more media content items associated with a content owner. In doing so, one or more similarities between the first media content item and the one or more media content items can be identified. For example, upon receiving a media content item from a content creator (e.g., via an upload provided by the content creator to a media sharing service), one or more aspects of the received media content item (e.g., a content fingerprint of the media content item) can be compared with various previously stored media content item(s), such as those provided by one or more content owner(s). In doing so, one or more similarities and/or matches between the media content item (e.g., the media content item provided by/received from the content creator, such as at block 210) and one or more other media content items (e.g., those associated with the content owner) can be identified. Such a similarity/match can indicate that the received media content item (e.g., the media content item provided by/received from the content creator, such as at block 210) is likely to include and/or incorporate one or more media content item(s) that are owned/controlled by a particular content owner. In one aspect, block 220 is performed by content presentation definition engine 130.

It should be understood that the referenced content owner can be, for example, one or more individuals and/or entities that possess and/or control the legal rights to one or more media content items 141 (e.g., audio content, video content, image content, etc.), such as media content item(s) 141 stored in media content store 140 of media sharing service 120, as depicted in FIG. 1. Examples of such a content owner include but are not limited to individual artists, music publishing companies, movie studios, etc. As described herein, being that various other media content items (e.g., media content items provided by other content creators to a media sharing service) may incorporate and/or otherwise include content owned/controlled by such a media content owner, the media content owners may wish to dictate and/or otherwise control or configure one or more aspects of a content presentation interface within which such media content item(s) (e.g., fan videos, remixes, etc., which are created by other content creators but which incorporate content owned by the content owner) are presented. Accordingly, as described herein, one or more aspects of a content presentation interface within which such media content item(s) are presented can be defined by/in relation to the content owner. It should be understood that such a content presentation interface can be, for example, a webpage, mobile application, and/or any other such presentation interface or context within which content (e.g., text, media, etc.) can be presented/arranged (e.g., a media sharing site/service, a social networking site/service, etc.).

By way of illustration, FIG. 3A depicts an exemplary content presentation interface 300 (e.g., of a media sharing service, social networking service, etc.) which incorporates a media content item 141A ('My acoustic cover . . . ') provided by a content creator ('PopFan2013') and which incorporates content ('Rock Song') owned by a content owner ('Pop Star'). As depicted in FIG. 3A and described herein, upon identifying/determining that the media content item (e.g., media content item 141A as depicted in FIG. 3A) includes and/or otherwise incorporates content owned by a content owner, one or more aspects of content presentation interface 300 can be defined, adjusted, and/or otherwise configured in relation to the content owner. For example, as shown in FIG. 3A, media content item 141B ('Rock Song (Official Video)') can be included/prioritized within a list of related videos presented in conjunction with media content item 141A.

By way of further illustration, FIG. 3B depicts an exemplary content presentation interface 300 (e.g., of a media sharing service, social networking service, etc.) which incorporates a media content item 141A ('My review . . . ') provided by a content creator ('PopFan2013') and which may incorporate content owned by a content owner ('Pop Star'). As depicted in FIG. 3B and described herein, upon identifying/determining that the media content item (e.g., media content item 141A as depicted in FIG. 3B) includes and/or otherwise incorporates content owned by a content owner, one or more aspects of content presentation interface 300 can be defined, adjusted, and/or otherwise configured in relation to the content owner. For example, as shown in FIG. 3B, sponsored content item 151 ('Don't' miss . . . ') (e.g., an advertisement) can be incorporated within content presentation interface 300 and presented in conjunction with media content item 141A.

It should also be understood that, in certain implementations, the referenced sponsored content item can be selected by sponsored content server 160 from a set of sponsored content items and provided to the server 120 or the social network 170 (or served to the user device in response to instructions from the server 120 or the social network 170). For example, sponsored content items such as ads can be auctioned to determine what ads should be returned to the server 120 and/or the order in which they should be presented to the user. This determination may depend on, for example, other advertisers' bids (e.g., the maximum amount an advertiser will pay per user click on an advertisement) and/or the performance scores of the ads. The performance score of an ad may be calculated based on, for example, historical click-through rates, relevance of an advertiser's ad text and keywords, an advertiser's account history, etc. In another implementation, the ads are selected by the sponsored content server 160 on a reservation basis (e.g., based on predefined conditions) without taking into account other advertisers' bids and/or the performance scores of the ads.

Moreover, in certain implementations the media content item (e.g., the media content item provided by/received from the content creator, such as at block 210) can be processed in relation to one or more media content items associated with a content owner to determine an interval of the first media content item within which the one or more similarities between the first media content item (e.g., the media content item provided by/received from the content creator, such as at block 210) and the one or more media content items (e.g., those provided by a content owner) are present. That is, it can be appreciated that while a media content item provided by a content creator may incorporate content (e.g., a song, video, image, etc.) owned by another content owner, the actual interval during which such incorporated content is presented within the media content item provided by the content creator may be less than the entire duration of the media content item provided by the content creator. For example, a three minute video clip provided by a content creator (e.g., to a media sharing service) may incorporate a song owned by a content owner during just one minute of the three minute video. Accordingly, in identifying a media content item that incorporates content owned by other content owner(s), it can be further advantageous to identify or determine the interval (e.g., chronological interval) of such a provided media content item during which the media content item(s) owned by the referenced content owner(s) are presented. In doing so, a content owner can define or otherwise dictate one or more aspects of a content presentation interface within which a media content item (e.g., provided by a content creator and which incorporates content owned by the content owner) is presented, such as in relation to one or more intervals of such a media content item that are identified/determined to incorporate media content items owned by a content owner.

By way of illustration, FIG. 4A depicts an exemplary content presentation interface 300 (e.g., of a media sharing service, social networking service, etc.) which incorporates a media content item 141A ('My review . . . ') provided by a content creator ('PopFan2013') and which incorporates content ('Rock Song') owned by a content owner ('Pop Star') during a portion or segment of the media content item. As depicted in FIG. 4A and described herein, upon identifying/determining the interval within the media content item (e.g., media content item 141A) during which the content owned by a content owner (e.g., 'Rock Song,' which is owned by 'Pop Star'), one or more aspects of content presentation interface 300 can be defined, adjusted, and/or otherwise configured in relation to such an interval. For example, as shown in FIG. 4A, while the interval of media content 141A which is determined to incorporate 'Rock Song' is playing, content presentation interface 300 can be defined/configured not to present other content (e.g., sponsored content such as advertisements). However, as depicted in FIG. 4B, during other intervals (e.g., in which content owned by a content owner is not being presented, such as during an interval in which the content creator is providing commentary such as 'That's my favorite song . . . ,' as shown in FIG. 4B), one or more aspects of content presentation interface 300 can be configured to provide other content items, e.g., sponsored content item 151, as shown. In doing so, the content owner can define various aspects of content presentation interface 300 such that other aspects of the interface do not distract from intervals of media content item 141A during which content owned by the content owner is presented, while also enabling the presentation of additional content items (e.g., sponsored content item 151) during other intervals in which content owned by the content owner is not being presented.

At block 230, one or more content presentation parameters can be received. In certain implementations, such content presentation parameters can be received from a content owner (e.g., the content owner of the media content item(s) with respect to which one or more similarities were identified at block 220). In certain implementations, such content presentation parameters can include one or more content presentation parameters associated with a particular media content item (e.g., a particular media content item provided by a content creator). For example, it can be appreciated with reference to FIG. 3A that a content owner (e.g., 'Pop Star') can define various content presentation parameters with respect to a particular media content item provided by a content creator (e.g., media content item 141A, 'My acoustic cover . . . ,' as shown in FIG. 3A). Such content presentation parameters can dictate, for example, that a particular content item associated with the content creator (e.g., 'Rock Song (Official Video)') is to be provided as the first 'related video' in content presentation interface 300, as shown. Such functionality can be advantageous, for example, in a scenario in which the content owner wishes to present a user viewing media content item 141A with a particular media content item (e.g., media content item 141B) that may be closely related and/or relevant to the media content item provided by the content creator. In one aspect, block 230 is performed by content presentation definition engine 130.

Moreover, in certain implementations, such content presentation parameters can include one or more content presentation parameters associated with media content items determined to have one or more similarities with one or more media content items associated with the content owner. For example, it can be appreciated with reference to FIG. 3B that a content owner (e.g., 'Pop Star') can define various content presentation parameters with respect to any number of media content items provided by a content creator (e.g., media content item 141A, 'My review . . . ,' as shown in FIG. 3B). Such content presentation parameters can dictate, for example, that one or more sponsored content item(s) (e.g., advertisements, such as sponsored content item 151 as shown in FIG. 3B) is/are to be provided within content presentation interface 300, as shown. Such functionality can be advantageous, for example, in a scenario in which the content owner wishes to present a user viewing a media content item (e.g., a media content item that incorporates any content associated with the content owner) with one or more sponsored content items.

Figure 3C:
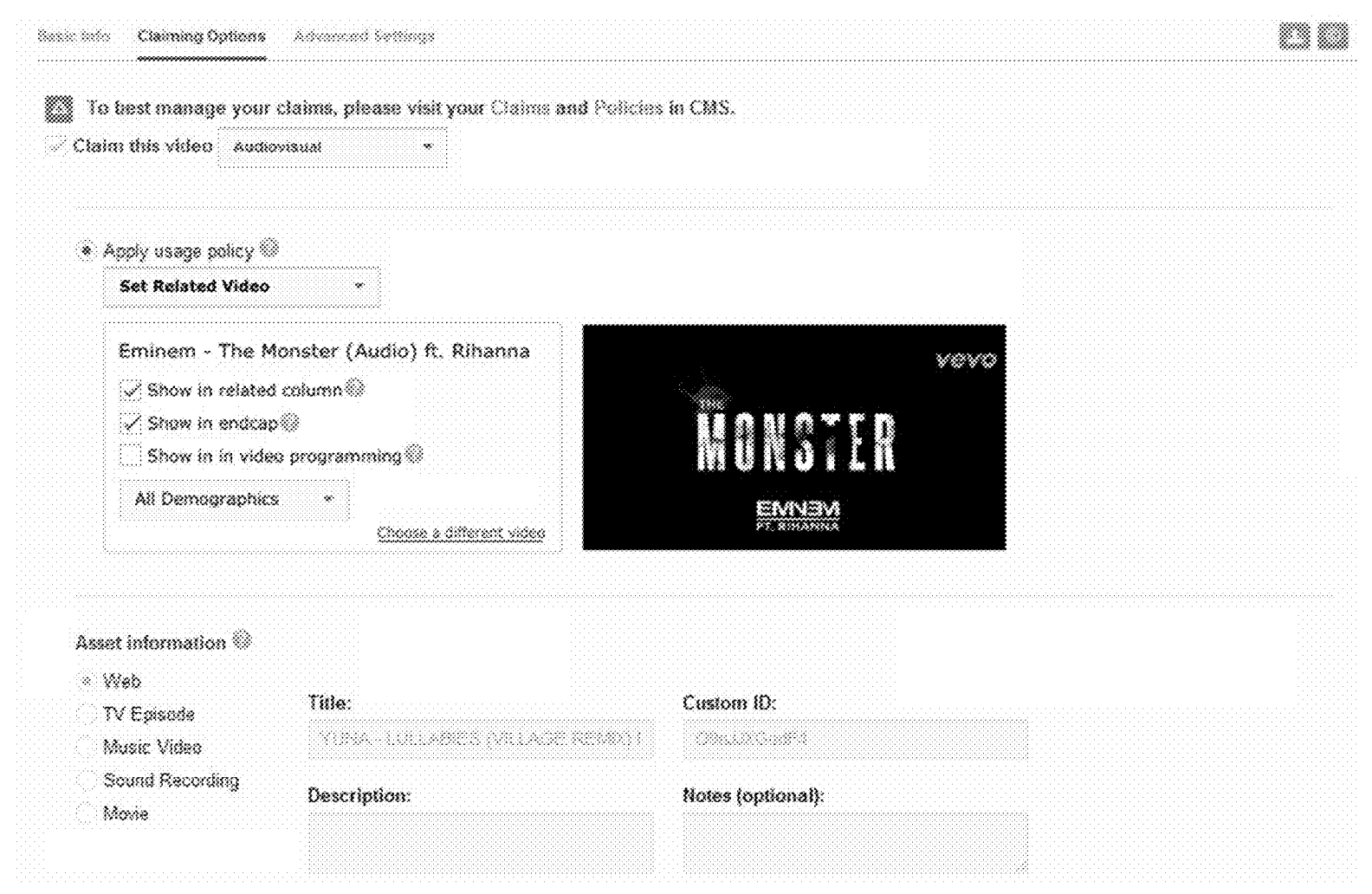

By way of illustration, FIG. 3C depicts an exemplary content presentation interface through which a content owner can provide the referenced content presentation parameters. As shown in FIG. 3C, a content owner can, for example, dictate/define that a particular media content item be provided/prioritized within a 'related video' segment/region provided in conjunction with a media content item (e.g., provided by a content creator) that incorporates aspects (e.g., audio and/or video) of the media content item owned by the content owner. Moreover, as depicted in FIG. 3C, in certain implementations the content owner can dictate/define one or more characteristics with respect to which the content presentation interface (e.g., a content presentation interface within which a media content item, such as the media content item received from the content creator at block 210, is presented) is to be defined. For example, a content owner can dictate that the referenced content presentation interface is (or is not) to be defined in a particular manner specifically with respect to users having one or more characteristics (e.g., being among a particular demographic, having a particular interest, being present in a particular location, etc.).

At block 240, one or more aspects of a content presentation interface (e.g., a content presentation interface within which a media content item, such as the media content item received from the content creator at block 210, is presented) can be defined. Examples of such aspects of a content presentation interface include but are not limited to: the presence and/or absence of sponsored content items (e.g., advertisements), the presence and/or absence of links to related content items (e.g., related videos, websites, applications, etc.), the presence and/or prioritization of the presentation of certain media content items as related content items, the presence and/or absence of certain types of sponsored content items/related content (e.g., content that may be inappropriate for certain demographics, e.g., advertisements for alcohol, media having a certain content rating, etc.), etc. In one aspect, block 240 is performed by content presentation definition engine 130.

In certain implementations, such aspects of a content presentation interface can be defined based on an identification of one or more similarities between the first media content item and the one or more media content items (e.g., as identified/determined at block 220). For example, as depicted in FIG. 3A and described herein, one or more aspects of a content presentation interface 300 can be defined (e.g., the particular 'related video' to present/prioritize). Moreover, in certain implementations such aspects of a content presentation interface can be defined in relation to a content owner (e.g., the content owner of the media content item(s) with respect to which one or more similarities were identified at block 220). For example, as depicted in FIG. 3B and described herein, one or more aspects of a content presentation interface 300 can be defined (e.g., one or more advertisements to present).

For example, in certain implementations defining the content presentation interface can include providing one or more sponsored content items within the content presentation interface. By way of illustration, as depicted in FIGS. 4A and 4B and described herein, having identified (e.g., at block 220) an interval within which content owned by a content owner is presented within a media content item provided by a content creator, various sponsored media content items (e.g., ads) can be presented in relation to such an interval.

By way of further example, in certain implementations defining the content presentation interface can include providing one or more links associated with the content owner within the content presentation interface. By way of illustration, as depicted in FIG. 3A and described herein, having identified (e.g., at block 220) a media content item provided by a content creator within which content owned by a content owner is incorporated, a link to a particular media content item (e.g., within a 'related videos' segment of the content presentation interface) can be presented/prioritized.

By way of further example, in certain implementations defining the content presentation interface can include defining one or more aspects of a content presentation within which the first media content item is presented, such as based on the one or more content presentation parameters (e.g., the content presentation parameters received at block 230). By way of illustration, a content owner may define one or more content presentation parameters to reflect that one or more sponsored content items (e.g., advertisements) are (or are not) to be presented in conjunction with a presentation of a media content item that incorporates content owned by the content owner (e.g., the presentation of an advertisement prior to presenting the media content item itself).

By way of further example, in certain implementations defining the content presentation interface can include providing a media content item associated with the content owner based on a determination that a presentation of a media content item (e.g., the media content item received from the content creator at block 210) has concluded. By way of illustration, a content owner may define one or more content presentation parameters to reflect that one or more media content items are to be presented (e.g., in an automated fashion, such that further input or selection from a user may not be necessary in order to activate the presentation of such media content item(s)) in conjunction with a presentation of a media content item that incorporates content owned by the content owner. By way of illustration and with reference to FIG. 3A, a content owner (e.g., 'Pop Star') can define that upon conclusion of the presentation of a media content item that incorporates content owned by the content owner (e.g., media content item 141A, 'My acoustic cover . . . '), another media content item (e.g., media content item 141B, 'Rock Song . . . ') is to be presented in an automated fashion (e.g., using an 'auto-play' feature in which a media content item can be presented even without user interaction/selection).

By way of further example, in certain implementations defining the content presentation interface can include providing one or more sponsored content items within the content presentation interface, such as is depicted in FIGS. 3B and 4B and described herein.

At block 250, a revenue distribution can be defined. In certain implementations such revenue can be generated in relation to a presentation of one or more sponsored content items (e.g., ads, such as can be presented at block 240). Moreover, in certain implementations such a revenue distribution (e.g., a revenue distribution scheme or plan which outlines/defines the manner in which the referenced revenue is to be distributed among various parties, e.g., the content owner and/or the content creator) can be generated based on one or more revenue distribution parameters provided by the content owner. Such revenue distribution parameters can dictate, for example, the manner in which revenues (e.g., advertising revenues) generated in relation to a media content item provided by a content creator which incorporates content owned by a content owner are to be divided/distributed. For example, in certain implementations a content owner may elect to receive all of such revenues, while in other implementations the content owner may elect to share a portion (or all) of such revenues with the content creator. In yet other implementations, the manner in which such revenues are divided/distributed can be associated/correlated with the manner/degree to which the content owner defines various aspects of the content presentation interface within which the media content item is presented. For example, in one scenario a certain percentage of the generated revenues can be distributed to the content creator based on the content owner defining that a particular media content item should appear as the first 'related video' (e.g. as depicted in FIG. 3A), while in another scenario a different percentage of the generated revenues can be distributed to the content creator based on the content owner defining that sponsored content items should be presented (e.g., as depicted in FIG. 3B). Accordingly, such a revenue distribution can be defined and revenue generated can be subsequently distributed, such as in accordance with such a revenue distribution. In one aspect, block 250 is performed by content presentation definition engine 130.

Figure 5:
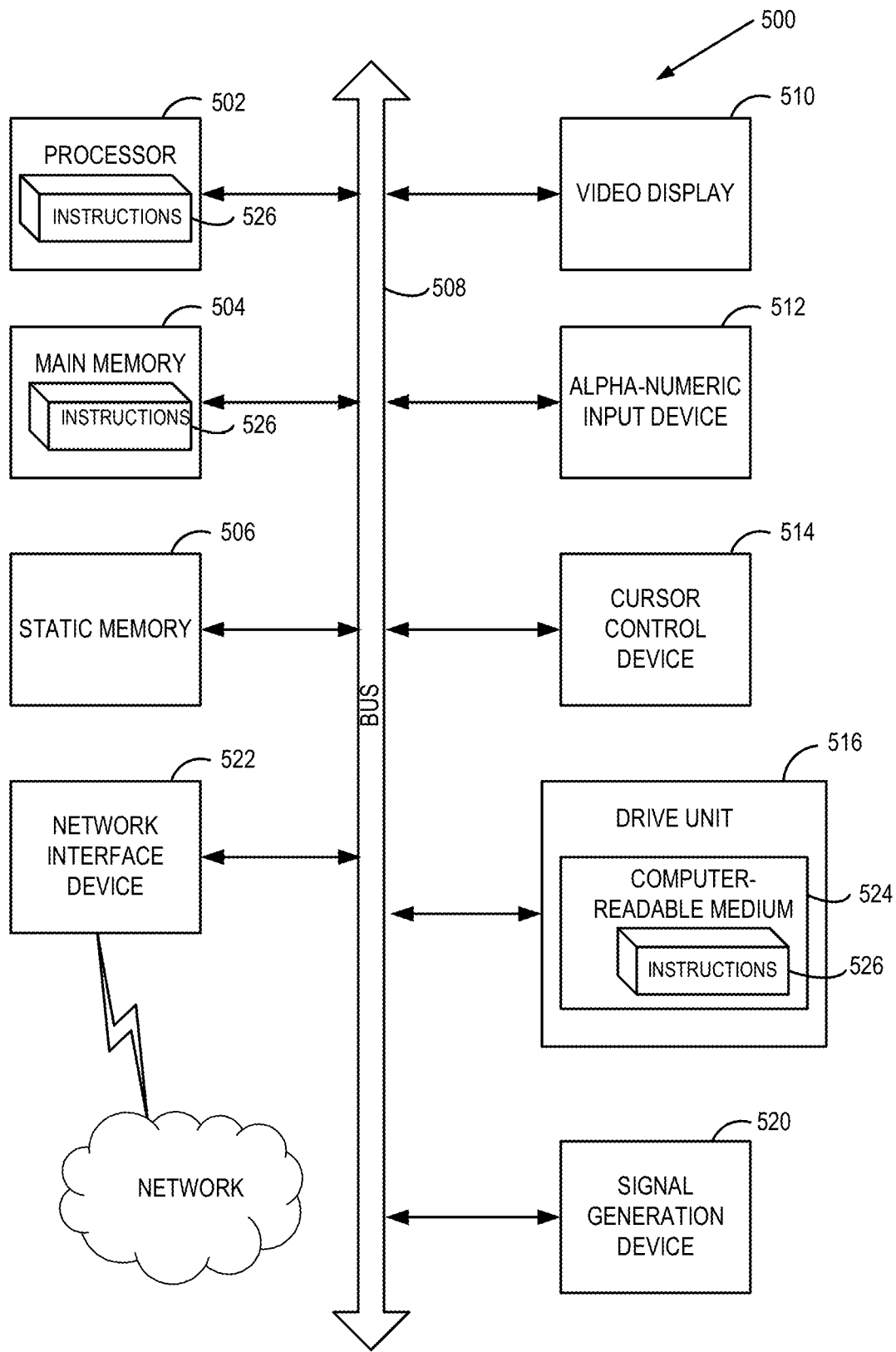
FIG. 5 depicts a block diagram of an illustrative computer system operating in accordance with aspects and implementations of the present disclosure.

FIG. 5 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 (e.g., instructions executed by collaboration manager 225, etc.) embodying any one or more of the methodologies or functions described herein. Instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "processing," "defining," "distributing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, media clips (e.g., images, audio clips, textual documents, web pages, etc.). The scope of the disclosure should, therefore, be determined with reference to the appended claims, along with the full scope of equivalents to which such claims are entitled.

What is claimed is:

1. A method comprising:
receiving a first media content item of a content creator from a device associated with the content creator;
processing the first media content item in relation to one or more media content items of a content owner to identify one or more similarities between the first media content item and the one or more media content items; and
responsive to an identification of one or more similarities between the first media content item and the one or more media content items, defining by a processing device, one or more aspects of a content presentation interface within which the first media content item is to be presented in an arrangement with additional content in the content presentation interface, wherein the one or more aspects of the content presentation interface specifies whether the additional content is to be provided with the first media content item and are defined based on input of the content owner of the one or more media content items having the one or more similarities with the first media item;
determining an interval of the first media content item of the content creator that includes the one or more similarities with the one or more media content items of the content owner; and
providing the additional content specified by the content presentation interface to be displayed with the first media content item in the content presentation interface on devices of viewing users based on the interval of the first media content item that includes the one or more similarities with the one or more media content items of the content owner.

2. The method of claim 1, further comprising:
determining to not provide the additional content during the interval of the first media content item that includes the one or more similarities with the one or more media content items of the content owner.

3. The method of claim 1, wherein defining one or more aspects of a content presentation interface comprises providing one or more sponsored content items within the content presentation interface in relation to the interval.

4. The method of claim 1, wherein defining one or more aspects of a content presentation interface comprises providing one or more links associated with the content owner within the content presentation interface.

5. The method of claim 1, further comprising receiving, from the content owner, the input comprising one or more content presentation parameters associated with at least one of (a) the first media content item or (b) media content items determined to have one or more similarities with one or more media content items associated with the content owner.

6. The method of claim 5, wherein defining one or more aspects of a content presentation interface comprises defining, based on the one or more content presentation parameters, one or more aspects of a content presentation within which the first media content item is to be presented.

7. The method of claim 1, wherein defining one or more aspects of a content presentation interface comprises providing at least one of the one or more media content items of the content owner based on a determination that a presentation of the first media content item has concluded.

8. The method of claim 1, wherein defining one or more aspects of a content presentation interface comprises providing one or more sponsored content items within the content presentation interface, the method further comprising: defining a revenue distribution with respect to revenue generated in relation to a presentation of the one or more sponsored content items based on one or more revenue distribution parameters provided by the content owner.

9. A system comprising:
a memory; and
a processing device, coupled to the memory, to:
receive a first media content item of a content creator from a device associated with the content creator;
process the first media content item in relation to one or more media content items of a content owner to identify one or more similarities between the first media content item and the one or more media content items; and
define, based on an identification of one or more similarities between the first media content item and the one or more media content items, one or more aspects of a content presentation interface within which the first media content item is to be presented in an arrangement with additional content in the content presentation interface, wherein the one or more aspects of the content presentation interface specifies whether the additional content is to be provided with the first media content item and are defined based on input of the content owner of the one or more media content items having the one or more similarities with the first media item;
determine an interval of the first media content item of the content creator that includes the one or more similarities with the one or more media content items of the content owner; and
provide the additional content specified by the content presentation interface to be displayed with the first media content item in the content presentation interface on devices of viewing users based on the interval of the first media content item that includes the one or more similarities with the one or more media content items of the content owner.

10. The system of claim 9, wherein the processing device is further to determine to not provide the additional content during the interval of the first media content item that includes the one or more similarities with the one or more media content items of the content owner.

11. The method of claim 9, wherein to define one or more aspects of a content presentation interface, the processing device is to provide one or more sponsored content items within the content presentation interface in relation to the interval.

12. The system of claim 9, wherein to define one or more aspects of a content presentation interface, the processing device is to provide one or more links associated with the content owner within the content presentation interface.

13. The system of claim 9, wherein the processing device is further to receive, from the content owner, the input comprising one or more content presentation parameters associated with at least one of (a) the first media content item or (b) media content items determined to have one or more similarities with one or more media content items associated with the content owner.

14. The system of claim 13, wherein to define one or more aspects of a content presentation interface, the processing device is to define, based on the one or more content presentation parameters, one or more aspects of a content presentation within which the first media content item is to be presented.

15. The system of claim 9, wherein to define one or more aspects of a content presentation interface, the processing device is to provide at least one of the one or more media content items of the content owner based on a determination that a presentation of the first media content item has concluded.

16. The system of claim 9, wherein to define one or more aspects of a content presentation interface, the processing device is to provide one or more sponsored content items within the content presentation interface, and wherein the processing device is further to define a revenue distribution with respect to revenue generated in relation to a presentation of the one or more sponsored content items based on one or more revenue distribution parameters provided by the content owner.

17. A non-transitory computer readable medium having instructions stored thereon that, when executed by a processor, cause the processor to perform operations comprising:
  receiving a first media content item of a content creator from a device associated with the content creator;
  processing the first media content item in relation to one or more media content items of a content owner to identify one or more similarities between the first media content item and the one or more media content items;
  responsive to an identification of one or more similarities between the first media content item and the one or more media content items, defining one or more aspects of a content presentation interface within which the first media content item is to be presented in an arrangement with additional content in the content presentation interface, wherein the one or more aspects of the content presentation interface specifies whether the additional content is to be provided with the first media content item and are defined based on input of the content owner of the one or more media content items having the one or more similarities with the first media item;
  determining an interval of the first media content item of the content creator that includes the one or more similarities with the one or more media content items of the content owner; and
  providing the additional content specified by the content presentation interface to be displayed with the first media content item in the content presentation interface on devices of viewing users based on the interval of the first media content item that includes the one or more similarities with the one or more media content items of the content owner.

18. The non-transitory computer readable medium of claim 17, the operations further comprising determining to not provide the additional content during the interval of the first media content item that includes the one or more similarities with the one or more media content items of the content owner.

19. The non-transitory computer readable medium of claim 17, wherein to define one or more aspects of a content presentation interface, the operations further comprise providing one or more sponsored content items within the content presentation interface in relation to the interval.

* * * * *